United States Patent Office 2,973,345
Patented Feb. 28, 1961

---

2,973,345

VINYLCYCLOHEXANETHIOL MODIFIED POLYMERS

Fredrick M. Smith, Rosamond, Calif., and James E. Pritchard, Bartlesville, Okla., assignors to Phillips Petroleum Company, a corporation of Delaware No Drawing. Original application Sept. 8, 1952, Ser. No. 308,715, now Patent No. 2,842,526, dated July 8, 1958. Divided and this application July 30, 1957, Ser. No. 675,021

11 Claims. (Cl. 260—79)

This invention relates to polymers modified by a vinylcyclohexanethiol. In one aspect, the invention relates to vinylcyclohexanethiol-containing polymers. In another aspect, the invention relates to a method for the preparation of a polymer prepared using a vinylcyclohexanethiol as a comonomer. In a further aspect, the invention relates to the production of a sulfur-containing benzene-insoluble synthetic rubber. In a still further aspect of the invention, it relates to the treating of a synthetic polymer or copolymer in latex or solution form with a vinylcyclohexanethiol to obtain lower Mooney value rubbers or softer but largely benzene-insoluble polymers and resinous materials insoluble in benzene, e.g., butadiene and styrene are copolymerized in the presence of vinylcyclohexanethiol or polybutadiene in latex, or, say, benzene solution form, is treated with vinylcyclohexanethiol to obtain lower Mooney value rubbers, softer but largely benzene-insoluble polybutadiene and gel-like resinous material insoluble in benzene, respectively.

This application is a divisional application of Serial Number 308,715, filed September 8, 1952, and now U.S. Patent 2,842,526, issued July 8, 1958.

In accordance with the present invention, a vinylcyclohexanethiol, as described in U.S. Patent 2,842,526, can be incorporated into a synthetic rubber by adding it to a recipe from which such a rubber is prepared or to a latex or to a solution to produce a synthetic rubber or resin having desirable properties.

The vinylcyclohexanethiols produced in accordance with this invention are useful as modifiers in the production of synthetic rubber. They are also useful for treating rubber-like polymers to convert said polymers to oil-resistant resins.

The synthetic rubber or polymer can be one prepared by polymerization of a recipe containing butadiene alone or together with another monomer, say, styrene. A polymer prepared from butadiene alone, in latex, recipe or solution form, can be contacted with vinylcyclohexanethiol in the presence of oxygen to produce a useful product as herein further described.

An object of this invention is the production of modified synthetic polymers. Another object of the invention is the provision of a method for producing modified synthetic polymers. A further object of the invention is the production of a modified synthetic rubber or rubber-like material which is possessed of a desirably low Mooney value and/or is insoluble in benzene to a substantial extent.

Other aspects, objects, and advantages of the invention are apparent from the study of this application and the appended claims.

*Example I*

Vinylcyclohexanethiol prepared as described and claimed in U.S. Patent 2,842,526 and having a boiling point in the range 98–101° C. (208.4–213.8° F.) at 35 mm. Hg and a refractive index, $n_D^{20}$, of 1.5106 was used as a modifier in a series of runs for the copolymerization of butadiene with styrene at 50° C. The polymerization recipe was as follows:

| | Parts by weight |
|---|---|
| Butadiene | 75 |
| Styrene | 25 |
| Water | 180 |
| Sodium soap flakes | 5 |
| Vinylcyclohexanethiol | Variable |
| Potassium persulfate | 0.3 |

The following results were obtained:

| Vinylcyclohexanethiol, Parts by Weight | Wt. Percent | Time, Hours | Conversion, Percent | Mooney Value, ML–4 |
|---|---|---|---|---|
| 0.3 | 0.11 | 13.8 | 74 | 126 |
| 0.5 | 0.18 | 14.3 | 73 | 90 |
| 0.7 | 0.25 | 15.8 | 76 | 55 |
| 1.1 | 0.39 | 17.7 | 78 | 49 |
| 1.6 | 0.56 | 18 | 74 | 20 |

These data show that increased proportions, in the range 0.1 to 0.6 weight percent of vinylcyclohexanethiol in the recipe result in decreased Mooney values, yielding a desirable rubber product.

*Example II*

A sample of 58 Mooney (ML–4) polybutadiene in latex form was treated with vinylcyclohexanethiol, prepared as hereinbefore described, in an amount sufficient to saturate 15 percent of the double bonds (assuming that there is one double bond per $C_4$ unit in the polybutadiene molecule and that one mole of mercaptan reacts with each double bond). The mixture was agitated for 176 hours at 50° C. in the presence of oxygen. The resulting rubbery polymer contained 1.96 percent sulfur, corresponding to saturation of 3.6 percent of the available double bonds. This product was slightly softer than the original polybutadiene and was composed largely of benzene-insoluble material of utility in products required to contact benzene and like materials.

*Example III*

A benzene solution of 58 Mooney (ML–4) polybutadiene was treated with vinylcyclohexanethiol in an amount sufficient to saturate 30 percent of the double bonds (assuming that there is one double bond per $C_4$ unit in the polybutadiene molecule and that one mole of mercaptan reacts with each double bond). After the mixture was agitated at 50° C. for 88 hours, in the presence of oxygen a material was obtained which contained 3.18 percent sulfur, corresponding to saturation of 6.8 percent. The product was a gel-like, resinous material which was insoluble in benzene and exhibited low swelling characteristics after being immersed in benzene for several weeks.

Examples II and III show that a benzene-resistant rubber is obtained by treating polybutadiene with vinylcyclohexanethiol in the presence of oxygen for a time in the range 88 to 176 hours. A temperature in the range 20 to 100° C. is suitable.

Variation and modification are possible within the scope of the foregoing disclosure and appended claims to the invention, the essence of which is that a vinylcyclohexanethiol for example, as prepared by the catalytic reaction of vinylcyclohexene with hydrogen sulfide can be incorporated into a synthetic rubber, a rubber-like polymer or copolymer, as described and that rubber-like polymers can be rendered resistant to benzene by treatment with a vinylcyclohexanethiol, as described.

We claim:

1. A synthetic rubber selected from the group consisting of polybutadiene and a butadiene-styrene-copolymer rubber which is chemically modified by the incorporation therein of a small modifying amount of monovinylcyclohexanethiol.

2. A process for preparing synthetic rubber which process comprises subjecting to copolymerization conditions a mixture comprising butadiene, styrene, water, a sodium soap, potassium persulfate, and from 0.1 to 0.6 weight percent of vinylcyclohexanethiol, and recovering a synthetic rubber material so produced.

3. A method of preparing a benzene-insoluble synthetic rubber which comprises mixing a polybutadiene with monovinylcyclohexanethiol in an amount sufficient to saturate from 15 to 30 percent of the double bonds in said polybutadiene, agitating the mixture for a time in the range 88 to 176 hours at a temperature in the range 20 to 100° C. in the presence of oxygen and recovering a sulfur-containing, benzene-insoluble rubber material.

4. The process of claim 3 in which the polybutadiene is in the form of a polybutadiene latex.

5. A rubber according to claim 1 wherein said polymer is a butadiene-styrene copolymer, the amount of vinylcyclohexanethiol in said rubber is in the range 0.1 to 0.6 weight percent, and the Mooney value (ML–4) is in the range 20 to 126.

6. A process which comprises chemically reacting into a synthetic rubbery copolymer of butadiene and styrene a small modifying amount of monovinylcyclohexanethiol.

7. A process for preparing a synthetic rubber which comprises polymerizing a rubber recipe selected from the group consisting of recipes yielding a polybutadiene and a butadiene-styrene rubber containing a small modifying amount of monovinylcyclohexanethiol.

8. A process for the preparation of a chemically modified synthetic rubber-like polymer selected from the group consisting of polybutadiene and butadiene-styrene copolymer which comprises incorporating into the polymer during the preparation of said polymer a small modifying amount of vinylcyclohexanethiol.

9. A process for preparing a polymer from a recipe selected from the group consisting of recipes yielding a polybutadiene and a butadiene-styrene rubber which comprises incorporating 0.1–0.6 weight percent based on the final rubber of vinylcyclohexanethiol into said recipe.

10. A process for modifying a polybutadiene which comprises contacting together for an extended time in the presence of oxygen, a polybutadiene and a vinylcyclohexanethiol, the proportion of the vinylcyclohexanethiol added being sufficient to saturate double bonds in the polybutadiene to an extent to render the final product insoluble in benzene to a substantial extent.

11. The process of claim 3 in which the polybutadiene is in the form of a benzene solution of polybutadiene.

References Cited in the file of this patent

UNITED STATES PATENTS

| | | |
|---|---|---|
| 2,543,867 | Pritchard | Mar. 6, 1951 |
| 2,806,843 | Welch | Sept. 17, 1957 |